US009288110B2

(12) United States Patent
Liu

(10) Patent No.: US 9,288,110 B2
(45) Date of Patent: Mar. 15, 2016

(54) MANAGEMENT OF SHARED RISK GROUP IDENTIFIERS FOR MULTI-LAYER TRANSPORT NETWORKS WITH MULTI-TIER RESOURCES

(75) Inventor: Stephen S. Liu, Acton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 813 days.

(21) Appl. No.: 12/577,530

(22) Filed: Oct. 12, 2009

(65) Prior Publication Data

US 2011/0087784 A1    Apr. 14, 2011

(51) Int. Cl.
*G06F 15/16*  (2006.01)
*H04L 12/24*  (2006.01)

(52) U.S. Cl.
CPC .......... *H04L 41/0893* (2013.01); *H04L 41/147* (2013.01); *H04L 41/0803* (2013.01)

(58) Field of Classification Search
USPC .................................. 709/223–226, 238–244
See application file for complete search history.

(56) References Cited

U.S. PATENT DOCUMENTS

| 7,577,099 | B1 * | 8/2009 | Greenberg et al. | 370/242 |
| 2002/0112072 | A1 * | 8/2002 | Jain | 709/239 |
| 2003/0147352 | A1 * | 8/2003 | Ishibashi et al. | 370/248 |
| 2007/0214255 | A1 * | 9/2007 | Spitz et al. | 709/224 |

OTHER PUBLICATIONS

Sebos et al., "Auto-discovery of Shared Risk Link Groups". 2001.*
Sebos et al., "Effectiveness of Shared Risk Link Group Auto-Discovery in Optical Networks". 2000.*
Papadimitriou et al. "Inference of Shared Risk Link Groups" Apr. 15, 2001.*
Dharanikota et al., "Achieving Diversity in Optical Networks Using Shared Risk Groups." 2001.*

* cited by examiner

*Primary Examiner* — Scott B Christensen

(57) ABSTRACT

A system includes a plurality of resources. A network analysis device is configured to identify a shared risk between at least two of the resources. A method includes arranging a plurality of resources in a resource group, identifying, by at least one network analysis device, a shared risk between at least two of the plurality of resources, and assigning a shared risk identifier to each resource having the shared.

33 Claims, 3 Drawing Sheets

```
SRG_ID Lists at Each Tier 1 Resource:
A1: [a1]                A19: [a19, b5]
A2 : [a2, b1, c1]       A20: [a20, b5] & [a20, b6, c3]
    [a2, b2]
A3 : [a3, b2]
A4 : [a4, b3, c2]
    [a4, b4, c3]
A18 : [a18, b4, c3]
```

```
Sharing scopes of shared
SRG_IDs:
b2: {A2, A3}
b4: {A4, A18}
b5: {A19, A20}
c3: {A4, A18, A20}
```

```
Final SRG_IDs Assignments:
A1: a1
A2 : c1 and b2
A3 : b2
A4 : c2 and c3
A18 : c3
A19 : b5
A20 : c3 and b5
```

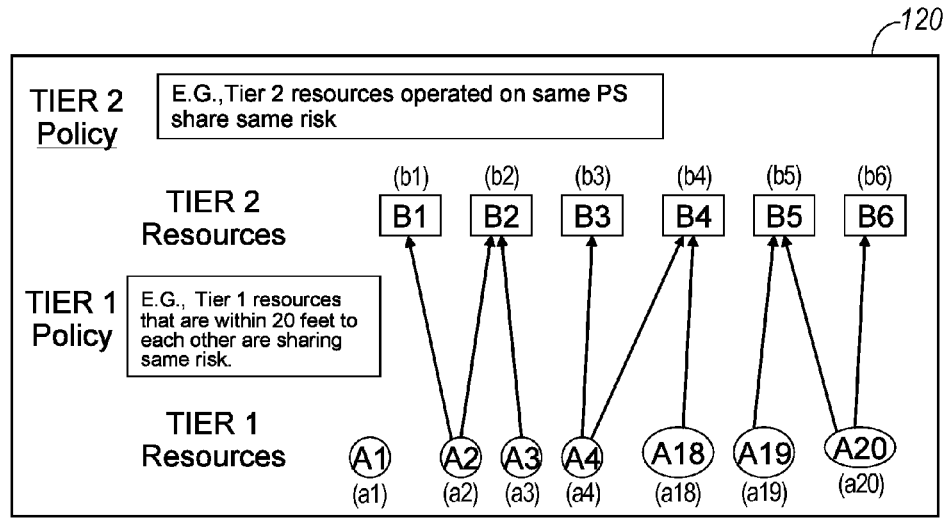
FIG. 3A
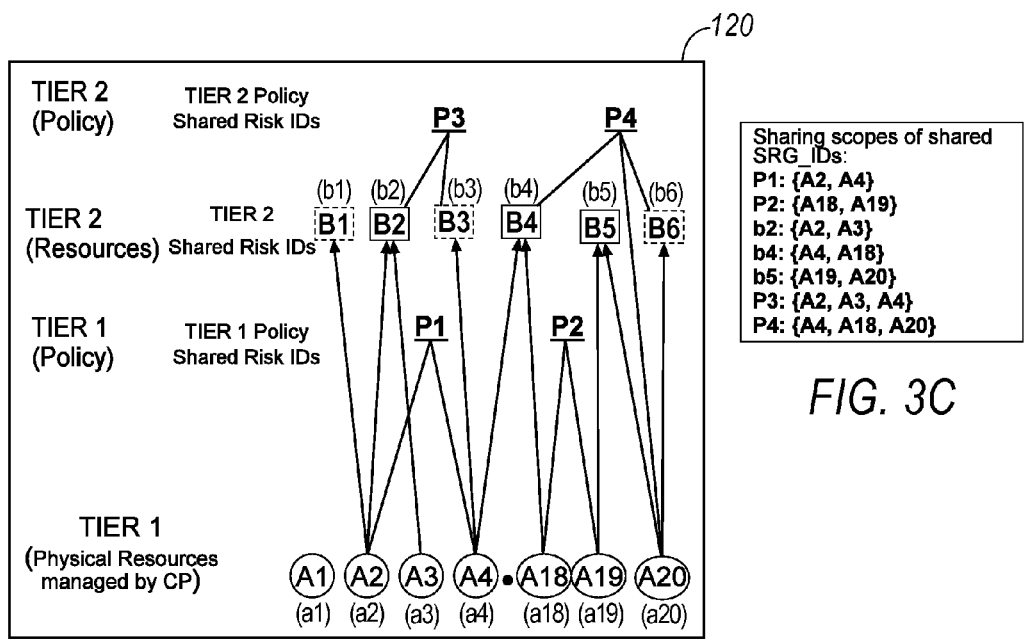
FIG. 3B
FIG. 3C
FIG. 3D

MANAGEMENT OF SHARED RISK GROUP IDENTIFIERS FOR MULTI-LAYER TRANSPORT NETWORKS WITH MULTI-TIER RESOURCES

BACKGROUND

Network provisioning involves a service provider preparing and equipping a network to provide network services to customers. Provisioners may be individuals who monitor network resources and provision the network accordingly. For example, a provisioner may determine whether more network resources are required to service a specific geographic area based on information available to the provisioner. The service provider may require that the provisioned network comply with various rules. For example, the service provider may require that the network implement a diversity scheme. Diversity in a network means that two or more communications channels are used to communicate between network devices. If one channel fails, communication between the network devices is not lost because another channel remains active.

Historically, it has been difficult for provisioners to provision to the network to properly comply with the service provider's diversity scheme simply because it is difficult to track the physical location of each network resource and diversity relationship among all resources. While the network may seem to comply with the diversity scheme, many supposedly diverse channels share a similar risk. For example, two different fibers may be used to communicate between two network devices, giving the appearance of diversity. However, two seemingly diverse fiber optic cables may run through the same pipe before reaching their eventual destination. As a result, the two fiber optic cables share a similar risk (e.g., a single incidence could damage the pipe and sever all of the fiber optic cables within that pipe). Accordingly, a system is needed that helps provisioners properly provision a network to comply with the service provider's diversity scheme.

BRIEF DESCRIPTION OF THE DRAWINGS

FIG. 3A illustrates an exemplary system for identifying shared risks among resources in a resource group having policies;

FIG. 3B illustrates an exemplary resource group tree indicating cross-tier dependency and policy violations;

FIG. 3C illustrates an exemplary list of sharing scopes for the exemplary resources group of FIG. 3B;

FIG. 3D illustrates an exemplary list of final shared risk identifiers for the exemplary multi-tier resource group of FIG. 3A.

DETAILED DESCRIPTION

An exemplary system includes a plurality of resources. A network analysis device is configured to identify a shared risk between at least two of the resources. A shared risk may exist if two or more same-tier resources rely upon the same higher-tier resource. For example, two same-tier resources share the same risk if they are at least partially physically contained within the same higher-tier resource. For example, two fiber optic cables share a risk with one another when the two fiber optic cables at least partially extend through one conduit. Alternatively, two same-tier resources may share the same risk if they depend upon the same higher-tier resource for operational support. For example, two circuit packs share the same risk with one another if they are powered by the same power supply. Moreover, a service provider may define policy-based risks even if there is no physical shared risk. For example, a policy may state that two resources within a predetermined distance from one another for a minimum length share the same risk. A telecommunications service provider may use such a system to ensure that a network is properly provisioned to meet various diversity requirements.

Figures 1, 2A, 2B, 2C:
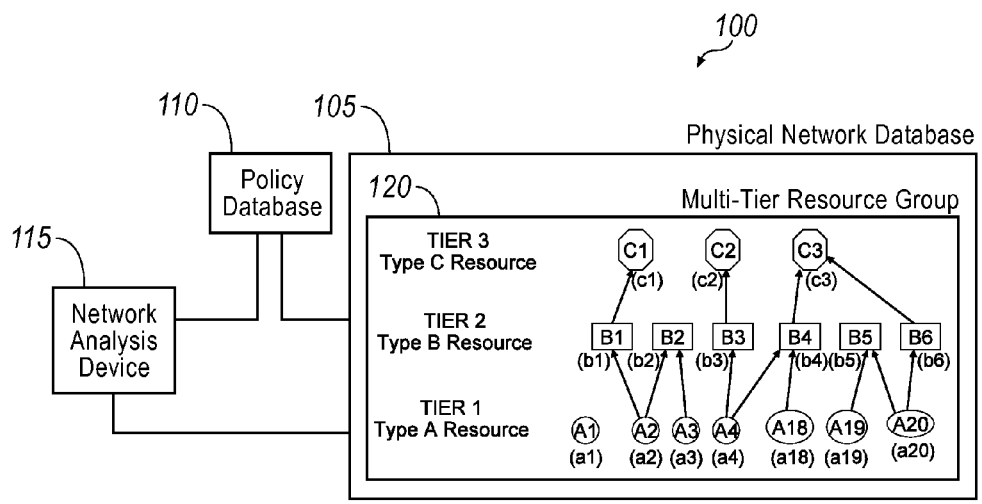
FIG. 1 illustrates an exemplary system for identifying shared risks among resources in a resource group.
FIG. 2A illustrates an exemplary list of shared risk identifiers that may be generated by a network analysis device.
FIG. 2B illustrates an exemplary list of sharing scopes that may be generated by the network analysis device.
FIG. 2C illustrates an exemplary table of final shared risk identifiers that may be assigned by the network analysis device.

FIG. 1 illustrates an exemplary system 100 having a physical network database 105 storing information about a plurality of resources in a network and a policy database 110 storing one or more policies that may govern the resources. The system 100 further includes a network analysis device 115 in communication with the physical network database 105 and the policy database 110. The system 100 may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used.

The physical network database 105 may store information about the plurality of resources. For example, the physical network database 105 may define the resources as part of a multi-tier resource group 120. In a multi-tier resource group 120, each of the resources is assigned a tier depending on the type of resource. Various resources may be divided into one or more multi-tier resource groups depending on a network operator's diversity requirements, in which case the process specified herein may apply to each separate multi-tier resource group to derive the final shared risk group identifiers. In one exemplary approach, the resources in Tier 1 may represent a fiber optic cable. The resources in Tier 2, then, may be conduits through which the fiber optic cables pass (e.g., pipes in a city). Continuing with that exemplary approach, the resources in Tier 3 may be bridges or tunnels that carry the pipes over or through a body of water. The tiers in a multi-tier resource group 120 may have different or alternative meanings with respect to the resources. For instance, the Tier 2 resources may include power supplies that operationally support the Tier 1 fiber optic cables.

As illustrated in FIG. 1, the physical relationship of the resources to one another are represented by the physical network database 105 as a resource group tree. In the resource group tree, each resource in a specific tier may be graphically represented having a specific shape. In the exemplary illustration of FIG. 1, each resource on Tier 1 is graphically represented by a circle, each resource on Tier 2 is graphically represented by a square, and each resource on Tier 3 is graphically represented by an octagon. The physical relationship of each resource may be represented by a line connecting a resource in one tier to a resource in another tier. For example, in FIG. 1, a line connects resource A2 to resource B1, meaning that resource A2 is at least partially physically contained within resource B1. Alternatively, the line may indicate that resource A2 is operationally supported by resource B1. Moreover, a line connects resource A2 to resource B2, meaning that, at some point, resource A2 is at least partially physically contained within or operationally supported by resource B2. Furthermore, a line connects resource A3 to resource B2, meaning that resource A3 relies upon resource B3 for physical or operational support. However, the physical and operational relationships of the resources may be represented in another format, such as in a table. Moreover, although three tiers are illustrated in FIG. 1, the multi-tier resource group 120 may have any number of tiers.

At various times or for various distances, a lower-tier resource may rely upon multiple higher-tier resources for operational or physical support. For example, referring to FIG. 1, resource A2 may be a fiber optic cable, resources B1 and B2 may be separate pipes, and resource C1 may be a bridge. In the multi-tier resource group 120 of FIG. 1, the fiber optic cable A2 may be within the pipe B1 for 100 feet before crossing the bridge C1. On the other side of the bridge C1, the fiber optic cable A2 may enter the pipe B2 for 200 hundred feet. Therefore, the fiber optic cable A2 is in the pipe B1 at the same time the fiber optic cable A2 is crossing the bridge C1.

The physical network database 105 may store information about each resource. For example, the physical network database 105 may store a name of the resource (e.g., "A1," "A2," "B1," "B2," "C1," "C2," etc.), the type of resource (e.g., fiber, fiber optic cable, conduit, etc.), the geographical location of the resource, shared risk identifiers (e.g., "a1" for resource A1, "a2" for resource A2, and so on) indicating that the resource shares one or more physical or policy-based risk with other resources as discussed in greater detail below, the physical relationship between each of the resources, the operational relationship between each of the resources, and the like. As illustrated in FIG. 1, continuing with the previous example, resource A2 is a fiber cable that may be carried in the conduit represented by resource B1, which runs through the bridge represented by resource C1.

The policy database 110 may store policies that can be used to govern the resources. The policies may include one or more standard policies set forth by a government agency or standards body. Alternatively, in a telecommunications network, a service provider may determine one or more of the policies. The policy may define various rules regarding the way the network may be provisioned. For example, one policy may define minimum quality of service requirements, including diversity schemes, to be implemented in the network. Therefore, due to a policy violation, two resources may lack diversity even if the resources are physically diverse.

For example, separate fibers may experience a shared risk if both fibers are disposed within the same fiber optic cable. Therefore, any group of lower-tier resources (e.g., Tier 1 resources as illustrated in FIG. 1) that rely upon the same higher-tier resource (e.g., Tier 2 or Tier 3 as illustrated in FIG. 1) lack physical and operational diversity. However, a group of resources need not be physically disposed within another resource or operationally supported by another resource to lack diversity. For example, a policy may define that same-tier resources lack diversity if they are within a predetermined distance from one another for a minimum length. The policy, in one exemplary approach, may define a shared risk as existing between two Tier 1 resources that are within 20 feet of one another for a distance of at least 30 feet. In this exemplary approach, if the fiber optic cables are Tier 1 resources, any two fiber optic cables that are within 20 feet of one another for a distance of at least 30 feet are assumed to share a risk, even though the two Tier 1 fiber optic cables may not extend through the same Tier 2 conduit.

Databases, data repositories or other data stores described herein, such as the physical network database 105 and the policy database 110, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

The network analysis device 115 may include a computing device in communication with the physical network database 105 and the policy database 110. The network analysis device 115 may be configured to identify a shared risk between at least two network resources. For example, using the resource group tree or table in the physical network database 105 and information in the policy database 110, the network analysis device 115 may be configured to identify physical shared risks (e.g., two lower-tier resources are physically contained within the same higher-tier resources), operational shared risk (e.g., two lower-tier resources rely upon the same higher-tier resource to operate), and policy-based shared risks (e.g., two same-tier resources are within a predetermined distance from one another for a minimum length) for each resource in a multi-tier resource group 120.

Once the shared risk is identified, the network analysis device 115 may be configured to associate the shared risk with a shared risk identifier, and assign the shared risk identifier to each resource in the resource group sharing the same risk. In the exemplary resource group tree of FIG. 1, resources A2 and A3 rely upon resource B2. Therefore, the network analysis device 115 may be configured to identify that resources A2 and A3 share a risk and assign resources A2 and A3 the same shared risk identifier, as discussed in greater detail below. The network analysis device 115 may be further configured to store the shared risk identifier in the physical network database 105.

The network analysis device 115 may further be configured to assign a basic shared risk identifier to each single resource of interest in a network because each resource itself represents a shared risk. For instance, each fiber cable represents a shared risk for all fibers in the cable. The network analysis device 115 may assign the basic shared risk identifiers to all resources under consideration. For examples, all the shared risk identifiers (e.g., in parentheses in FIGS. 1 and 3A) associated with each resource in FIG. 1 and FIG. 3A are basic shared risk identifiers assigned by network analysis device 115.

Besides identifying physical shared risks, the network analysis device 115 may be configured to access one or more policies stored in the policy database 110 for each tier of resources and apply one or more of the policies to the resources on the same tier to identify policy-based shared risks. The network analysis device 115 may be configured to identify closed risk-sharing groups for each policy on every tier. The closed risk sharing group may include any subset of the resources on a tier in which every possible pair are involved in at least one policy violation instance. Each closed risk sharing group may be assigned a new policy-based shared risk identifier by the network analysis device 115 to represent the shared risk of all resources in the closed risk sharing group. For example, using the information in the physical network database 105, the network analysis device 115 may be configured to determine whether two or more resources violate the policy forming a closed risk sharing group, and thus, share the same policy-based risk. Once all closed risk sharing groups are identified, the network analysis device 115 may be configured to assign policy-based share risk identifiers to the closed risk sharing groups and associate each policy-based shared risk identifier to all the resources in the closed risk sharing group.

In general, computing systems and/or devices, such as the network analysis device 115, may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices include, without limitation, a computer workstation, a server, a desktop, notebook, laptop, or handheld computer, or some other known computing system and/or device.

Computing devices generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The network analysis device 115 may perform various processes to identify shared risks among resources in a multi-tier resource group 120. With reference to FIGS. 2A-2C, the network analysis device 115 may be configured to determine the basic shared risk identifier of each resource in the resource group. The network analysis device 115 may be configured to assign the basic shared risk identifier to each resource that may not already have basic shared risk identifier assigned. The network analysis device 115 may further be configured to list the shared risk identifiers of higher-tier resources that each lowest-tier resource at least partially relies upon directly or indirectly.

FIG. 2A includes an exemplary list of shared risk identifiers for Tier 1 resources that may be generated by the network analysis device 115. With the list of shared risk identifiers, the network analysis device 115 may identify shared risks for each Tier 1 resource. In the exemplary implementation illustrated in FIG. 1, resource A2 has two branches. First, resource A2 at least partially relies upon resource B1, which itself at least partially relies upon resource C1. Second, resource A2 also at least partially relies upon resource B2. Therefore, for resource A2, which is one of the resources on the lowest tier (i.e., Tier 1), the network analysis device 115 is configured to generate two lists of shared risk identifiers for resource A2. These two lists, for instance, may include shared risk identifiers a2, b1, c1, and a2, b2. The network analysis device 115 may be configured to iteratively repeat this portion of the process for each resource in the lowest tier. The complete list of shared risk identifiers within which each Tier 1 resource of FIG. 1 is at least partially contained or operationally supported by is illustrated at FIG. 2A.

Referring now to FIG. 2B, to eliminate redundancy, the network analysis device 115 may be further configured to identify a sharing scope of each higher-tier resource. The sharing scope may only apply to higher-tier resources directly or indirectly containing or operationally supporting multiple lowest-tier resources. The sharing scope for each higher-tier resource may be defined to be the set of lowest-tier resources that are contained or operationally supported by the higher-tier resource. For instance, in FIG. 1, there are three Tier 2 resources that contain or operationally support multiple Tier 1 resources, (i.e., the resources having shared risk identifiers of b2, b4, and b5), and one Tier 3 resource that contains or operationally supports multiple Tier 1 resources (i.e., having a shared risk identifier of c3) as shown in FIG. 2B. When the shared Tier 1 resources of one of the Tier 2 resources are fully contained within the sharing scope of one of the Tier 3 resources, the shared risk identifier for the Tier 2 resource will not be considered for final shared risk identifier selection (i.e., the shared risk identifier of the Tier 2 resource will not be applied to the Tier 1 resource it contains or operationally supports). Rather, the shared risk identifier of the Tier 3 resource will be applied. Therefore, in FIG. 2B, the shared risk identifier of b4 will be eliminated because its sharing scope is a subset of that of resource C3. Accordingly, the network analysis device 115 will apply the shared risk identifier of c3 to resources A4, A18, and A20.

To identify sharing scopes, the network analysis device 115 may list the lower-tier resources that rely upon each higher-tier resource. As illustrated in FIG. 1, the network analysis device 115 may be configured to determine that higher-tier resource B2 at least partially physically contains or operationally supports resources A2 and A3. Higher-tier resource C3 at least partially physically contains or physically supports resources B4 and B6, which in turn at least partially contain or physically supports resources A4, A18, and A20. Also illustrated in FIG. 1, resource B4 includes resources A4 and A18. Moreover, resource C3 includes resources A4, A18, and A20. The network analysis device 115 may be configured to identify that a sharing scope exists between resources B4 and C3 since each lower-tier resource contained with resource B4 (e.g., A4 and A18) is also included in resource C3. The network analysis device 115 may be configured to iteratively repeat this portion of the process for each higher-tier resource. The complete list of sharing scopes for the exemplary multi-tier resource group 120 of FIG. 1 is illustrated in FIG. 2B.

FIG. 2C includes an exemplary table of shared risk identifiers. After the sharing scopes have been identified for each higher-tier resource, the network analysis device 115 may be configured to assign the shared risk identifier to each resource in one or more tiers. Referring again to the exemplary multi-tier resource tree of FIG. 1, resource A2 may be assigned a shared risk identifier equivalent to the shared risk identifier for resource C1 (i.e., "c1") because resource C1 is the highest-tier resource that resource A2 at least partially relies upon. However, as previously discussed with respect to FIG. 2A, resource A2 as two separate chains—resource C1 is the highest-tier resource of one chain, and resource B2 is the highest-tier resource of the second chain. Therefore, resource A2 may also be assigned the shared risk identifier of resource B2 (i.e., "b2"). The network analysis device 115 may repeat this portion of the process for each of the lowest-tier resources. Although not illustrated in FIG. 2C, the network analysis device 115 may further repeat this portion of the process for higher-tier resources.

FIG. 3A illustrates an exemplary policy scheme applied to another multi-tier resource group with policies. In addition to identifying physical and operational relationships between the resources, the network analysis device 115 may be further configured to identify policy-based relationships between the resources on the same tier, including policy violations that indicate that a shared risk exists between resources. For instance, the Tier 1 resources may be governed by a Tier 1 policy that states, for example, that Tier 1 resources that are within 20 feet of one another for a distance of at least 30 feet share the same risk. Moreover, the Tier 2 resources may be governed by a Tier 2 policy. For clarity, only two tiers are illustrated in FIG. 3A. Thus, the resource group tree of FIG. 3A may include additional tiers. The network analysis device 115 may be configured to compare information about each resource from the physical network database 105 to the information stored in the policy database 110 to determine whether any resources violate any of the policies and assign a policy-based shared risk identifier to resources that share the same policy-based risk.

FIG. 3B illustrates an exemplary resource group tree showing policy violations in the exemplary multi-tier resource group 120 of FIG. 3A. As illustrated, the resources in the resource group are bound by two policies: one for Tier 1 and another for Tier 2. The network analysis device 115 may be configured to carry out the process discussed with respect to FIGS. 1 and 2 to obtain policy-based shared risk identifiers P1 and P2 for Tier 1, and P3 and P4 for Tier 2. For instance, the network analysis device 115 may be configured to identify closed risk-sharing groups for each policy on every tier, determine whether two or more resources violate the policy forming a closed risk sharing group, and thus, share the same policy-based risk, and assign policy-based share risk identifiers to the closed risk sharing groups and associate each policy-based shared risk identifier to all the resources in the closed risk sharing group. Each policy-based share risk identifier may indicate that a violation is detected among a set of the resources on that tier. For example, two lines extend from P1 to resources A2 and A4, which means resources A2 and A4 violate the Tier 1 policy (e.g., resources A2 and A4 are within 20 feet of one another for at least 30 feet). Similarly, the lines extending from P4 to resources B4 and B6 indicate that resources B4 and B6 violate the Tier 2 policy.

FIG. 3C illustrates an exemplary list of sharing scopes for the exemplary multi-tier resource group 120 of FIG. 3B. The sharing scopes of FIG. 3C may be determined by the network analysis device 115 the same way as previously discussed with regard to FIG. 2B. In the exemplary approach of FIG. 3C, the sharing scope of shared risk identifier b4 is fully contained in the sharing scope of policy-based shared risk identifier P4. Therefore, the network analysis device 115 will not use b4 in its down stream processing.

In one exemplary implementation, as illustrated in FIG. 3B, resource A2 at least partially relies upon resources B1 and B2, and violates Tier 1 policy at identifier P1. But, the sharing scopes of resource B2 (i.e., b2) and P1 are fully contained in the scope of P3. Therefore, the final shared risk identifiers to be assigned to A2 are "b1" and "P3." Similarly, the network analysis device 115 may assign shared risk identifiers of "b5" and "P4" to resource A20. To reduce redundancy, the network analysis device 115 may be configured to account for sharing scopes as previously discussed. If a sharing scope exists between a resource and a same-tier or higher-tier policy, the network analysis device 115 may select the shared risk identifier of the policy as the shared risk identifier instead of the higher-tier resource because the sharing scope of the shared risk identifier of the higher-tier resources is a subset of that of the shared risk identifier of the policy. As previously discussed, resource B2 and policy P3 define a sharing scope (e.g., all of the lower-tier resources that are at least partially contained within B2 also violate policy P3). In this exemplary approach, the network analysis device 115 may be configured to assign the policy-based shared risk identifier of P3 instead of the shared risk identifier of resource B2. Further, the network analysis device 115 may be configured to assign the shared risk identifiers of resource B2 and policy P3 despite the sharing scope.

FIG. 3D illustrates an exemplary list of final shared risk identifiers for the exemplary multi-tier resource group of FIG. 3A. The network analysis device 115 may be configured to assign the shared risk identifier of the highest-tier resource in which each of the lowest-tier resource at least partially relies upon. Moreover, the network analysis device 115 may be configured to assign the shared risk identifier of a policy to resources that violates that policy.

The network analysis device 115 may be further configured to weigh or prioritize the risk and apply a policy accordingly. For example, the network analysis device 115 may identify a greater risk based on various factors including physical, environmental, and geographical, etc. In one exemplary approach, the network analysis device 115 may determine that older resources have a greater risk than newer resources. If the resource includes a fiber optic cable, the network analysis device may apply more stringent policies to older fiber optic cables (e.g., older fiber optic cables that are within 40 feet of one another for a distance of at least 30 feet share a risk). Also, environment may play a factor when weighing or prioritizing risk. For example, the network analysis device 115 may apply a different policy to resources that are exposed to the elements (e.g., rain, snow, lightning strikes, etc.) or that travel under water (e.g., risk of ships dropping anchor and damaging the resource, risk of water damage, and the like). Further, the network analysis device 115 may apply a different policy to resources that are disposed in densely populated urban areas where resources are more likely to be closer together.

In addition, the network analysis device 115 may be configured to weigh the shared risk based on various circumstances. For instance, a first group of resources that are within 20 feet of one another for a distance of 200 feet shares a greater risk than a second group of resources that are within 20 feet of one another for only 30 feet. While a shared risk exists in both circumstances, the shared risk identifier assigned by the network analysis device 115 may reflect the weight of the shared risk. For instance, the shared risk identifier assigned may be different for resources that are within 20 feet of one another for over 200 feet when compared to other same-tier resources that are only within 20 feet of one another for only 30 feet.

Figure 4:
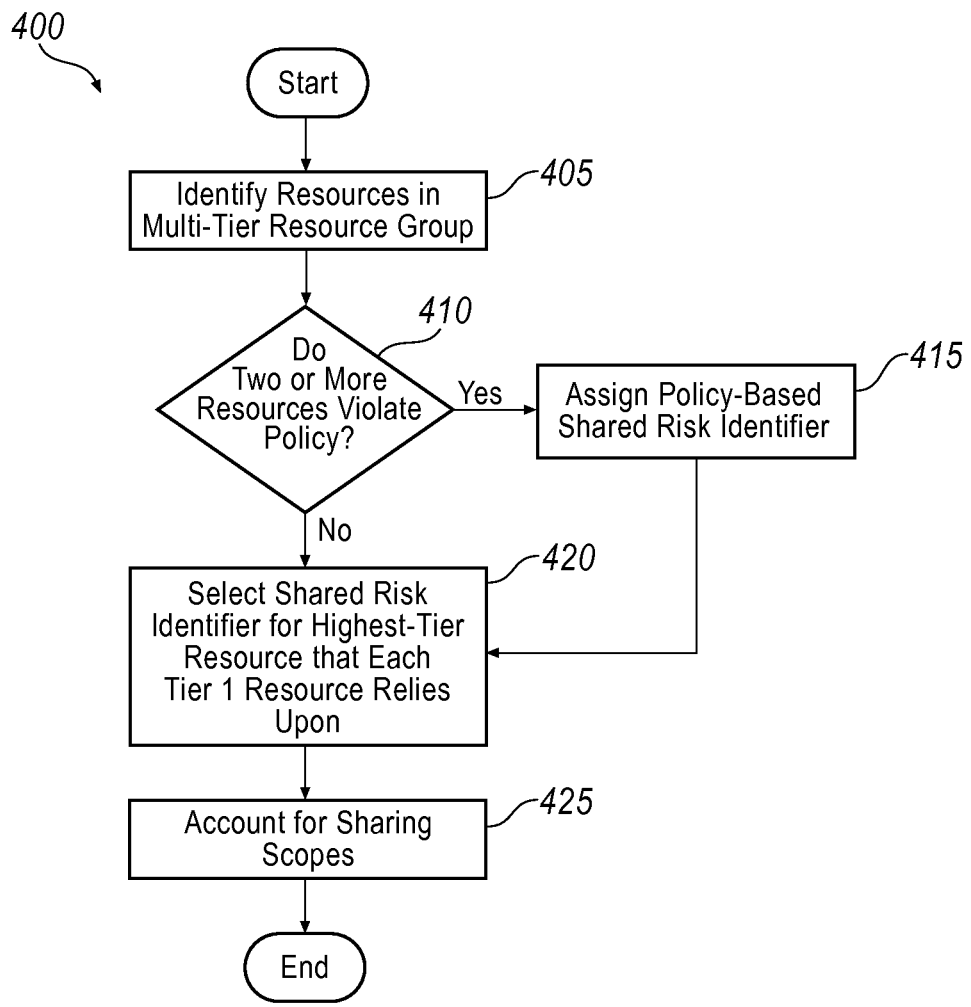
FIG. 4 illustrates an exemplary process for identifying final shared risk identifiers for the exemplary multi-tier resource group of FIG. 3A.

FIG. 4 illustrates an exemplary process for identifying a shared risk between at least two of the resources. In one exemplary approach, only the shared risk identifier of the highest-tier source that the lowest-tier resource relies upon may be considered as the shared risk identifier assigned to the lowest-tier resource.

Block 405 may include identifying resources in a multi-tier resource group. Each resource may be associated with a specific tier. Moreover, each tier in the resource group may be governed by a policy, as previously discussed.

Decision point 410 may include determining whether two or more same-tier resources violate the same-tier policy. Resources that violate the policy may be indentified as being part of a closed risk sharing group for each policy on each tier. As previously discussed, the closed risk sharing group may include any subset of the resources on a tier in which every possible pair is involved in at least one policy violation instance.

If two or more resources violate the same-tier policy, the process 400 moves to block 415, which may include assigning a policy-based shared risk identifier to the resources that violate the policy. For instance, the network analysis device 115 may assign the policy-based shared risk identifier to the resources that violate the same-tier policy. Therefore, each closed risk sharing group may be assigned a new policy-based shared risk identifier by the network analysis device 115 to represent the shared risk of all resources in the closed risk sharing group.

If no same-tier resources violate the policy, or after the policy-based shared risk identifier has been assigned, the process 400 may move to block 420. Block 420 may include assigning the shared risk identifier for the highest-tier resource that each lowest-tier resource relies upon. If the lowest-tier resource is a "root-only" resource (i.e., the lowest-tier resource does not rely upon any higher-tier resources), the network analysis device 115 may assign the shared risk identifier of the lowest-tier resource to itself. If the lowest-tier resource is apart of a single-branch tree (i.e., a Tier 1 resource that only relies upon one chain of upper tier resources), the network analysis device 115 may assign the shared risk identifier of the highest tier resource on the chain to the Tier 1 resource. If the Tier 1 resource is part of a multiple-branch tree (i.e., the Tier 1 resource involves, directly or indirectly, in policy violation or relies upon upper-tier resources that also tend to other Tier 1 resources), the network analysis device 115 may assign multiple shared risk identifiers to the Tier 1 resource (e.g., the share risk identifier of the highest-tier resource of each branch).

Block 425 may include accounting for sharing scopes. As previously discussed, the sharing scope for each higher-tier resource may be defined to be the set of lowest-tier resources that are contained or operationally supported by the higher-tier resource. Once identified, the network analysis device 115 may be configured to remove any redundancy by accounting for the sharing scopes.

The process 400 may be iteratively performed for each Tier 1 resource. When each Tier 1 resource is assigned one or more shared risk identifiers, the process 400 may end after block 425. When the process 400 is applied to an exemplary resource group as illustrated in FIG. 3B, the end result may be a table as illustrated in FIG. 3D.

In one exemplary approach, the process 400 previously described may be applied to each multi-tier resource group in a network. For instance, the resources may be divided into multiple multi-tier resource groups. The number of multi-tier resource groups and the resources contained in each group may be based on a network operator's diversity or other requirements. The process 400 previously described may be applied to each of the multi-tier resource groups to identify the final shared risk identifiers for each of the lowest-tier resources in each of the multi-tier resource groups.

The concepts described herein may further apply to a routing control plane. In routing, the control plane is a part of the routing architecture that draws the network map via, for example, a network table that defines what to do with incoming data. In order to implement a diversity scheme, whether physical, policy-based, or both, the routing control plane may use the shared risk identifiers to determine how data should be routed in the network, such as an optical transport network.

In one exemplary approach, the network analysis device 115 may be configured to assign a shared risk link group identifier to each control plane link in the network. The control plane link may include one or more Tier 1 resources from different resource groups. Thus, the shared risk link group identifier may be the union of each the shared risk identifiers for each resource in the control plane link. The shared risk link group identifier may be configured on the control plane to ensure end-to-end diversity for various protection and restoration schemes.

However, the shared risk link group identifier on a control plane link may include more shared risk identifiers than a control plane capable node can handle (e.g., for lack of memory). Therefore, the network analysis device 115 may be configured to assign a combination shared risk identifier to replace a group of shared risk identifiers previously included in the shared risk link group identifier. In one exemplary approach, the combination shared risk identifier may only be assigned to a group of shared risk identifiers, which do not contain any policy-based shared risk identifier. Moreover, the combination shared risk identifier may only be assigned to control plane links whose shared risk link group identifier contains the exact same group of shared risk identifiers. However, a combination shared risk identifier may be applied to multiple control plane links if the shared risk link group identifiers of these control plane links contain the same group of shared risk identifiers.

As an alternative to assigning a combination shared risk identifier, the network analysis device 115 may be configured to assign priorities to each shared risk identifier previously assigned. Therefore, if one or more nodes cannot handle numerous shared risk identifiers, the node may be configured to drop shared risk identifier associated with lower priority risks. Alternatively, the network analysis device 115 may be configured to remove shared risk identifiers associated with lower priority risks from the physical network database 105.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising:
    a physical network database storing information about a plurality of resources in a network, wherein
        each of the plurality of resources is assigned in the physical network database to different resource tiers of one or more multi-tier resource groups based on a corresponding type of resource, the resource tiers including lower and higher tiers with respective lower and higher tier resources; and
        each lower tier resource at least partially relies on at least one of the higher tier resources;
    a policy database storing one or more policy-based shared risk rules defining diversity requirements for provisioning the plurality of resources in the network; and
    a network analysis device configured to:
        analyze a shared risk for each of said plurality of resources based on at least one of the policy-based shared risk rules stored in the policy database that defines a predetermined distance between and a predetermined length shared by at least two of said plurality of resources and a resource tier for at least a portion of said plurality of resources based on the information stored in the physical network database,
        determine whether the policy-based shared risk rule is violated based at least in part on at least two of said plurality of resources being physically and operationally diverse from one another while being within the predetermined distance of each other for the predetermined length and sharing the same resource tier based on the information stored in the physical network database, and
        assign a shared risk identifier to each of the at least two resources in the physical network database in response to the policy-based shared risk rule being violated.

2. A system as set forth in claim 1, wherein said shared risk identifier is a policy-based shared risk identifier when the policy-based shared risk rule is violated.

3. A system as set forth in claim 1, wherein the network analysis device is configured to graphically represent said lower tier resources with a first shape and said higher tier resources with a second shape, and that at least one of said lower tier resources at least partially relies upon at least one of said higher tier resources with a line there between.

4. A system as set forth in claim 3, wherein said network analysis device is configured to determine which of said plurality of lower tier resources rely upon said higher tier resource.

5. A system as set forth in claim 4, wherein the at least two said resources are two of the lower tier resources that physically rely upon said at least one of the higher tier resources.

6. A system as set forth in claim 5, wherein said shared risk identifier is a physical shared risk identifier.

7. A system as set forth in claim 1, wherein the shared risk includes a first shared risk based on the predetermined distance and the predetermined length, and wherein the network analysis device is configured to identify each resource associated with the predetermined distance and the predetermined length of the first shared risk and a second predetermined distance and a second predetermined length of a second shared risk.

8. A system as set forth in claim 7, wherein the network analysis device is configured to determine whether all resources associated with the first shared risk are also associated with the second shared risk.

9. A system as set forth in claim 8, wherein the network analysis device is configured to assign a common risk identifier to each resource associated with the first shared risk and the second shared risk.

10. A system as set forth in claim 9, wherein the common risk identifier represents both the first risk and the second risk.

11. A system as set forth in claim 4, wherein the set of rules includes an operational shared risk rule that is violated when the at least two said resources are two of the lower tier resources that operationally rely upon said at least one of the higher tier resources.

12. A system as set forth in claim 11, wherein said shared risk identifier is an operational shared risk identifier when the operational shared risk rule is violated.

13. A system as set forth in claim 1, wherein physically while being within the predetermined distance of each other for the predetermined length includes the at least two resources being physically contained within a third network resource.

14. A system as set forth in claim 1, wherein operationally diverse is when the at least two resources rely upon a third resource to operate.

15. A system as set forth in claim 1, wherein violations of the policy-based shared risk rule are utilized along with the shared risk identifiers to determine how data should be routed in the system.

16. A system as set forth in claim 1, wherein the policy-based shared risk rule is violated when the at least two resources are physically and operationally diverse from one another while being within the predetermined distance of each other for the predetermined length including a minimum length.

17. A system as set forth in claim 1, wherein the predetermined distance is selected from one of no more than twenty feet and no more than forty feet, and wherein the predetermined length includes a minimum length that is selected from one of at least thirty feet and at least two-hundred feet.

18. A system as set forth in claim 1, the network analysis device further being configured to eliminate a shared risked identifier sharing a scope of at least one resource of said plurality of resources.

19. A system as set forth in claim 1, the network analysis device further being configured to assign said higher tier resources to each of a first chain and a second chain, wherein at least one of the first and second chains includes said lower tier resources that at least partially relies on the at least one of said higher tier resources.

20. A system as set forth in claim 1, the network analysis device further being configured to assign at least one of said first tier resources with the predetermined distance and the predetermined length and at least one of said second tier resources with a second predetermined distance and a second predetermined length.

21. A system as set forth in claim 1, the network analysis device further being configured to select the policy-based shared risk rule based in part on at least two factors selected from a physical factor, an environmental factor, and a geographical factor.

22. A system as set forth in claim 1, the network analysis device further being configured to select the policy-based shared risk rule based in part on an age of at least one of said plurality of resources.

23. A system as set forth in claim 1, the network analysis device further being configured to weigh the shared risk based in part on the predetermined distance between at least two of said plurality of resources.

24. A system as set forth in claim 1, wherein the shared risk identifier is associated with a closed group having at least two of said plurality of resources having the same resource tier and violating a same-tier policy-based shared risk rule.

25. A system as set forth in claim 1, wherein the shared risk identifier is associated with a root-only resource having at least one lower-tier resource of said plurality of resources that does not rely on a higher-tier resource of said plurality of resources.

26. A method comprising:
storing, in a physical network database, information about a plurality of resources in a network, wherein each of the plurality of resources is assigned in the physical network database to different resource tiers of one or more multi-tier resource groups based on a corresponding type of resource, the resource tiers including lower and higher tiers with respective lower and higher tier resources, and each higher tier resource at least partially relies on at least one of the higher tier resources;
storing, in a policy database, one or more policy-based shared risk rules defining diversity requirements for provisioning the plurality of resources in the network;
analyzing a shared risk for each of said plurality of resources based on at least one of the policy-based shared risk rules that defines a predetermined distance between and a predetermined length shared by at least two of said plurality of resources and a resource tier for at least a portion of said plurality of resources based on the information stored in the physical network database;
determining whether the policy-based shared risk rule is violated based at least in part on at least two of said plurality of resources being physically and operationally diverse from one another while being within the predetermined distance of each other for the predetermined length and sharing the same resource tier based on the information stored in the physical network database; and
assigning a shared risk identifier to each resource in the physical network database in response to the policy-based shared risk rule being violated.

27. A method as set forth in claim 26, wherein the shared risk identifier is a policy-based shared risk identifier when the policy-based shared risk rule is violated.

28. A method as set forth in claim 26, wherein the network analysis device is configured to graphically represent the lower tier resources with a first shape and the higher tier resources with a second shape, and that at least one of the lower tier resources at least partially relies upon at least one of the higher tier resources with a line therebetween.

29. A method as set forth in claim 28, further comprising determining, with a network analysis device, which of the plurality of lower tier resources at least partially rely upon the higher tier resource.

30. A method as set forth in claim 29, wherein the set of rules includes:
a physical shared risk rule that is violated when the at least two said resources are two of the lower tier resources that physically rely upon said at least one of the higher tier resources, and
an operational shared risk rule that is violated when the at least two said resources are two of the lower tier resources that operationally rely upon said at least one of the higher tier resources.

31. A method as set forth in claim 30, further comprising wherein the shared network identifier is a physical shared risk identifier or an operational based on whether the physical shared risk rule or the operational shared risk rule is violated.

32. A method as set forth in claim 27, further comprising assigning, with the network analysis device, the shared risk identifier to each of the resources in violation of the policy-based shared risk rule.

33. A system comprising:
a physical network database storing information about a plurality of resources in a network, wherein
each of the plurality of resources is assigned in the physical network database to different resource tiers of one or more multi-tier resource groups based on a corresponding type of resource, the resource tiers including lower and higher tiers with respective lower and higher tier resources; and
each lower tier resource at least partially relies on at least one of the higher tier resources;
a policy database storing one or more policy-based shared risk rules defining diversity requirements for provisioning the plurality of resources in the network; and
a network analysis device configured to:
analyze a shared risk for each of said plurality of resources based on at least one of the policy-based shared risk rules stored in the policy database that defines a predetermined distance between and a predetermined length shared by at least two of said plurality of resource and a resource tier for at least a portion of said plurality of resources based on the information stored in the physical network database,
determine whether the policy-based shared risk rule is violated based at least in part on at least two of said plurality of resources being physically and operationally diverse from one another while being within a predetermined distance of each other for the predetermined length and sharing the same resource tier, and wherein the policy-based shared risk rule includes varying the predetermined distance based on at least one of a resource type, an environment, a geography, and a resource age during the analysis of each resource based on the information stored in the physical network database, and assign a shared risk identifier to each of the at least two resources in the physical network database in response to the policy-based shared risk rule being violated.

* * * * *